United States Patent
Nagato et al.

(10) Patent No.: US 11,556,804 B2
(45) Date of Patent: Jan. 17, 2023

(54) CONTROL APPARATUS AND CONTROL SYSTEM

(71) Applicant: CANON KABUSHIKI KAISHA, Tokyo (JP)

(72) Inventors: Yuki Nagato, Tochigi (JP); Hiroshi Hagiwara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/145,556

(22) Filed: Jan. 11, 2021

(65) Prior Publication Data
US 2021/0216884 A1    Jul. 15, 2021

(30) Foreign Application Priority Data

Jan. 14, 2020    (JP) .............................. JP2020-003947

(51) Int. Cl.
G05B 15/02    (2006.01)
G06N 5/02    (2006.01)

(52) U.S. Cl.
CPC ............... G06N 5/02 (2013.01); G05B 15/02 (2013.01)

(58) Field of Classification Search
CPC .......... G06N 5/02; G06N 20/00; G05B 15/02; G05B 13/048
See application file for complete search history.

(56) References Cited

U.S. PATENT DOCUMENTS

| | | | |
|---|---|---|---|
| 2012/0150470 A1 | 6/2012 | Shirakata | |
| 2020/0101717 A1* | 4/2020 | Nishikawa | ............. B41J 2/0451 |

* cited by examiner

*Primary Examiner* — Michael W Choi
(74) *Attorney, Agent, or Firm* — Rossi, Kimms & McDowell LLP

(57) ABSTRACT

A control apparatus includes a prediction unit configured to repeatedly predict a first target value based on prediction information; a transmission/reception unit configured to repeatedly transmit the prediction information to a server and receive a second target value having higher prediction accuracy than the first target value predicted by the server; a management unit configured to update a first error of prediction in the prediction unit based on the second target value and the first target value; and a setting unit configured to set a control target value based on the first target value and the first error. A first time interval in which the prediction unit repeatedly predicts the first target value is shorter than a second time interval in which the transmission/reception unit repeatedly transmits the prediction information to the server.

19 Claims, 9 Drawing Sheets

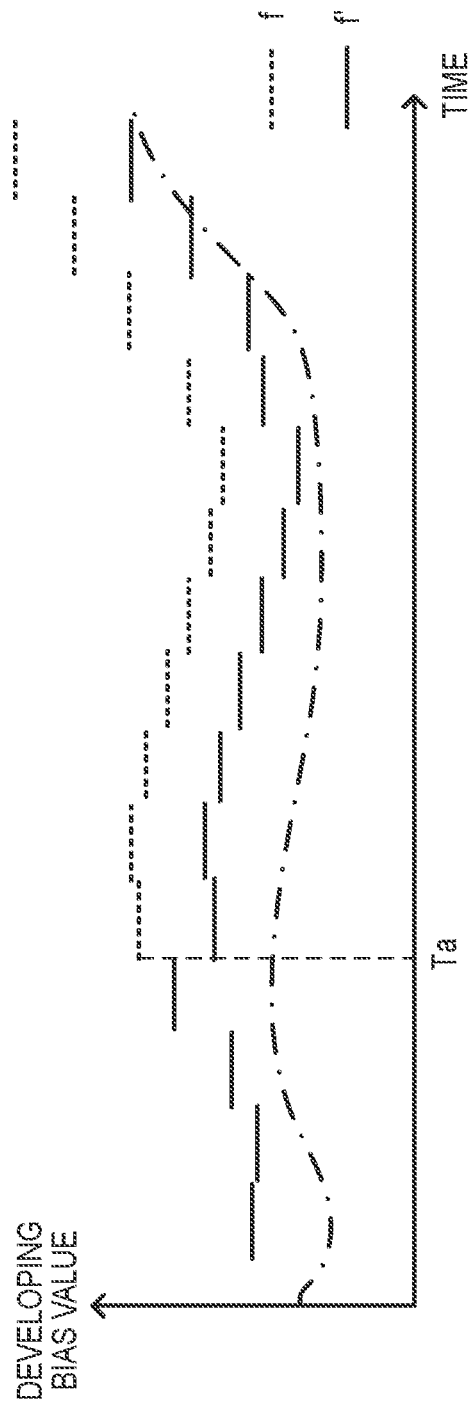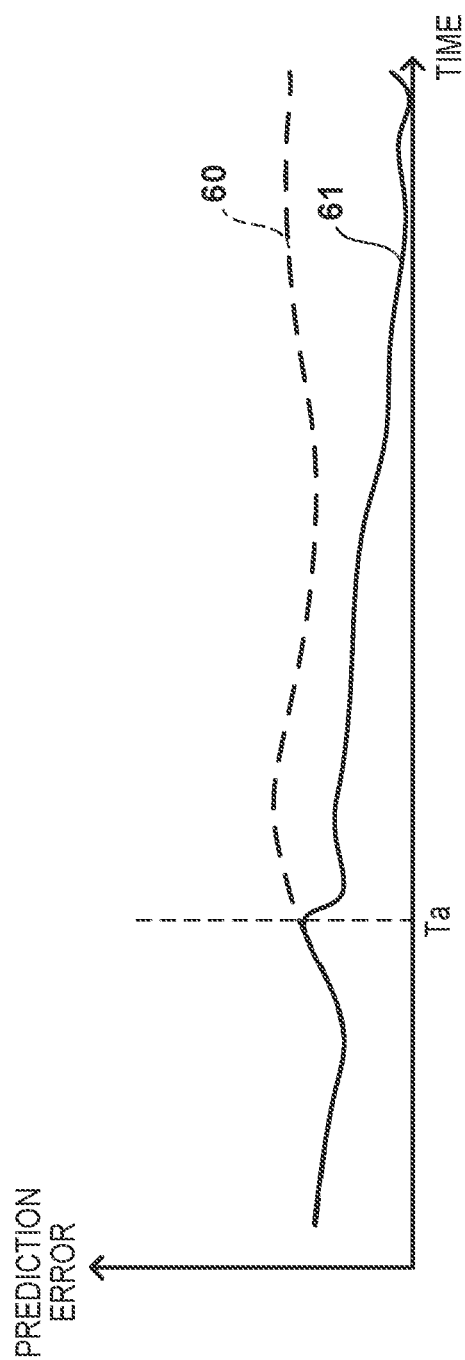

CONTROL APPARATUS AND CONTROL SYSTEM

BACKGROUND OF THE INVENTION

Field of the Invention

The present invention relates to a control apparatus that predicts a control target value and performs control, and a control system.

Description of the Related Art

For example, various apparatuses (control apparatuses) that predict a control target value for controlling a control object are used. For example, in order to improve the quality of an image to be formed, an image forming apparatus controls image formation timing so as to suppress misregistration. At this time, the current misregistration is used as a control target value, and the image formation timing is controlled so as to reduce the misregistration amount. Further, in order to improve the quality of the image to be formed, the image forming apparatus controls the image forming conditions relating to the density so that the density of the image to be formed becomes the density indicated by the image data. At this time, a value of an image forming condition for forming an image having a target density is used as a control target value. US-2012-0150470 discloses a configuration in which a server obtains a transfer function used by an image forming apparatus to predict a current misregistration amount.

For example, when a large-scale algorithm such as deep learning is used to increase the prediction accuracy of the control target value in the control apparatus, the processing load of the prediction processing in the control apparatus increases. In order to cope with the high processing load, it is necessary to provide a CPU having high processing performance and a storage device having a large capacity to the control apparatus, which increases the cost of the control apparatus. A configuration in which the prediction processing of the control target value is performed by an external server can be considered. However, in a configuration in which one server is provided for one or a small number of control apparatuses, the number of necessary servers increases, and the cost of the system increases. On the other hand, with a configuration in which one server is provided for a large number of control apparatuses, the number of servers can be reduced, but one server will perform the prediction processing of the control target values of the multiple control apparatuses, and the processing load on the server increases. In order to cope with this high processing load, it is necessary to provide a CPU having high processing performance and a storage device having a large capacity in the server, which increases the cost of the server.

SUMMARY OF THE INVENTION

According to an present disclosure, a control apparatus for predicting a control target value and controlling a control object includes: a collection unit configured to collect prediction information for predicting the control target value; a prediction unit configured to repeatedly predict a first target value based on the prediction information collected by the collection unit; a transmission/reception unit configured to repeatedly transmit the prediction information to a server and receive from the server, as a response to the prediction information transmitted to the server, a second target value predicted by the server based on the prediction information, the second target value having higher prediction accuracy than the first target value; a management unit configured to update a first error of prediction in the prediction unit based on the second target value and the first target value; and a setting unit configured to set the control target value based on the first target value and the first error. A first time interval in which the prediction unit repeatedly predicts the first target value is shorter than a second time interval in which the transmission/reception unit repeatedly transmits the prediction information to the server.

Further features of the present invention will become apparent from the following description of exemplary embodiments with reference to the attached drawings.

BRIEF DESCRIPTION OF THE DRAWINGS

FIG. 7A is a diagram illustrating an example of a temporal change of a predicted developing bias value.

FIG. 7B is a diagram illustrating an example of a temporal change of a prediction error.

DESCRIPTION OF THE EMBODIMENTS

Figure 1:
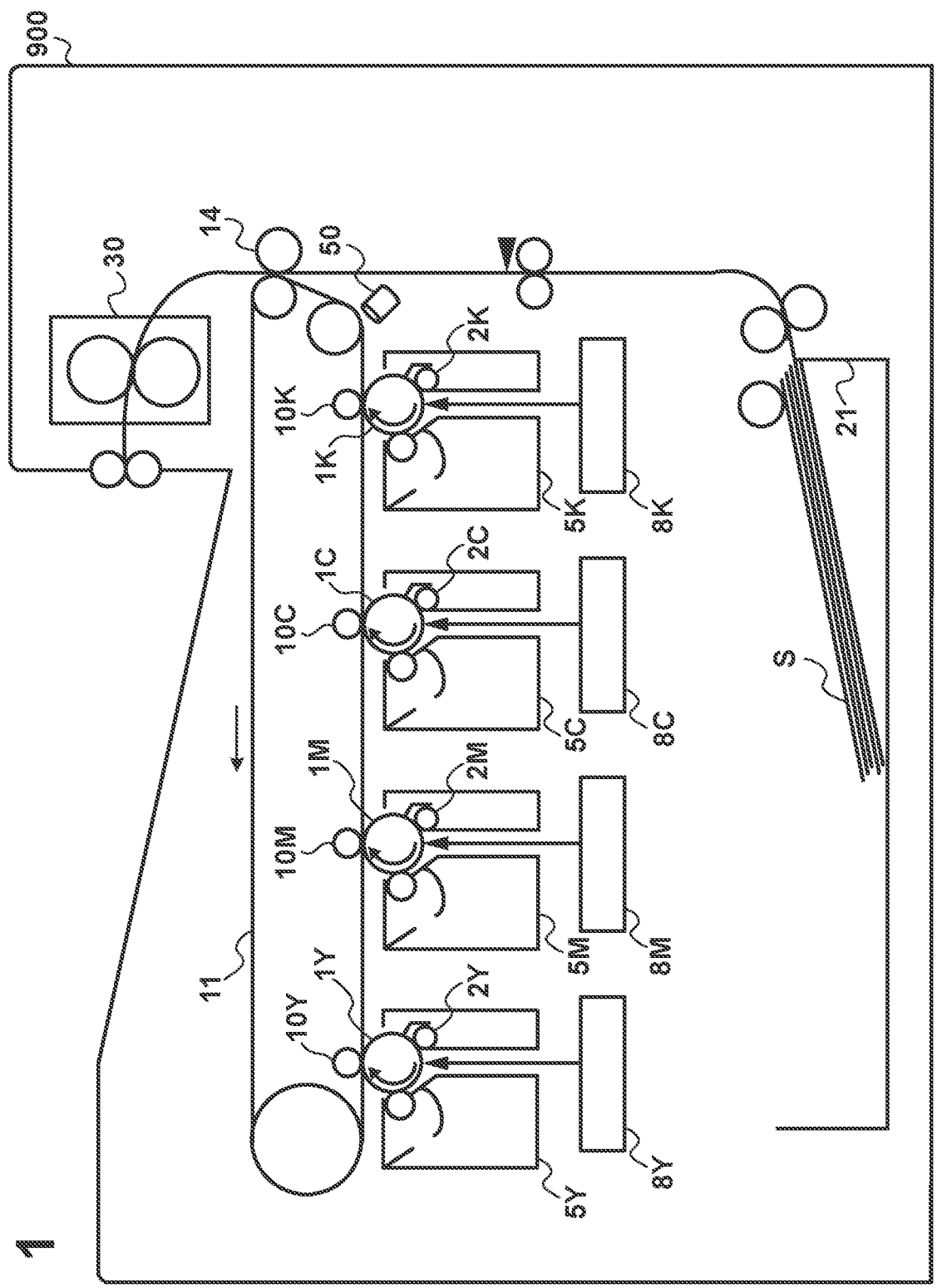
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, each embodiment will be described using an image forming system including an image forming apparatus and a server as an example of a control system including a control apparatus and a server. However, the present invention is applicable to any control system that performs control by predicting a control target value.

First Embodiment

FIG. 1 is a configuration diagram of an image forming apparatus 900 according to the present embodiment. The characters Y, M, C, and K at the end of the reference numerals in FIG. 1 indicate that the colors of the toner images, formed by participation of the members indicated by the reference numerals, are yellow, magenta, cyan, and black respectively. However, in the following description, when it is not necessary to distinguish colors, reference numerals in which the last character is omitted are used. A photoconductor 1 is rotationally driven in a clockwise direction in the figure when forming an image. A charging roller 2 charges the surface of the corresponding photoconductor 1 to a uniform potential by outputting a charging bias voltage. A laser unit 8 forms an electrostatic latent image on the photoconductor 1 by exposing the corresponding photoconductor 1. A developing unit 5 has toner of a corresponding color, and outputs a developing bias voltage to cause the toner to adhere to the electrostatic latent image of the corresponding photoconductor 1, thereby forming a toner image on the photoconductor 1. A primary transfer roller 10 outputs a primary transfer bias voltage to transfer the toner image formed on the corresponding photoconductor 1 to the intermediate transfer belt 11. A full color toner image can be formed on an intermediate transfer belt 11 by transferring the toner images of the respective photoconductors 1 to the intermediate transfer belt 11 in a superimposed manner.

The intermediate transfer belt 11 is rotationally driven in the counterclockwise direction in the figure during image forming. Thus, the toner image transferred onto the intermediate transfer belt 11 is conveyed to a position facing a secondary transfer roller 14. On the other hand, a recording material S in a cassette 21 is conveyed to a position facing the secondary transfer roller 14 by the respective rollers. The secondary transfer roller 14 transfers the toner image on the intermediate transfer belt 11 to the recording material S by outputting a secondary transfer bias voltage. After the transfer of the toner image, the recording material S is conveyed to a fixing unit 30. The fixing unit 30 fixes the toner image on the recording material S by heating and pressing the recording material S. After the toner image is fixed, the recording material S is discharged to the outside of the image forming apparatus. An optical sensor 50 detects a toner image for density correction control or a toner image for misregistration correction control, which are formed on the intermediate transfer belt 11.

Figure 2:
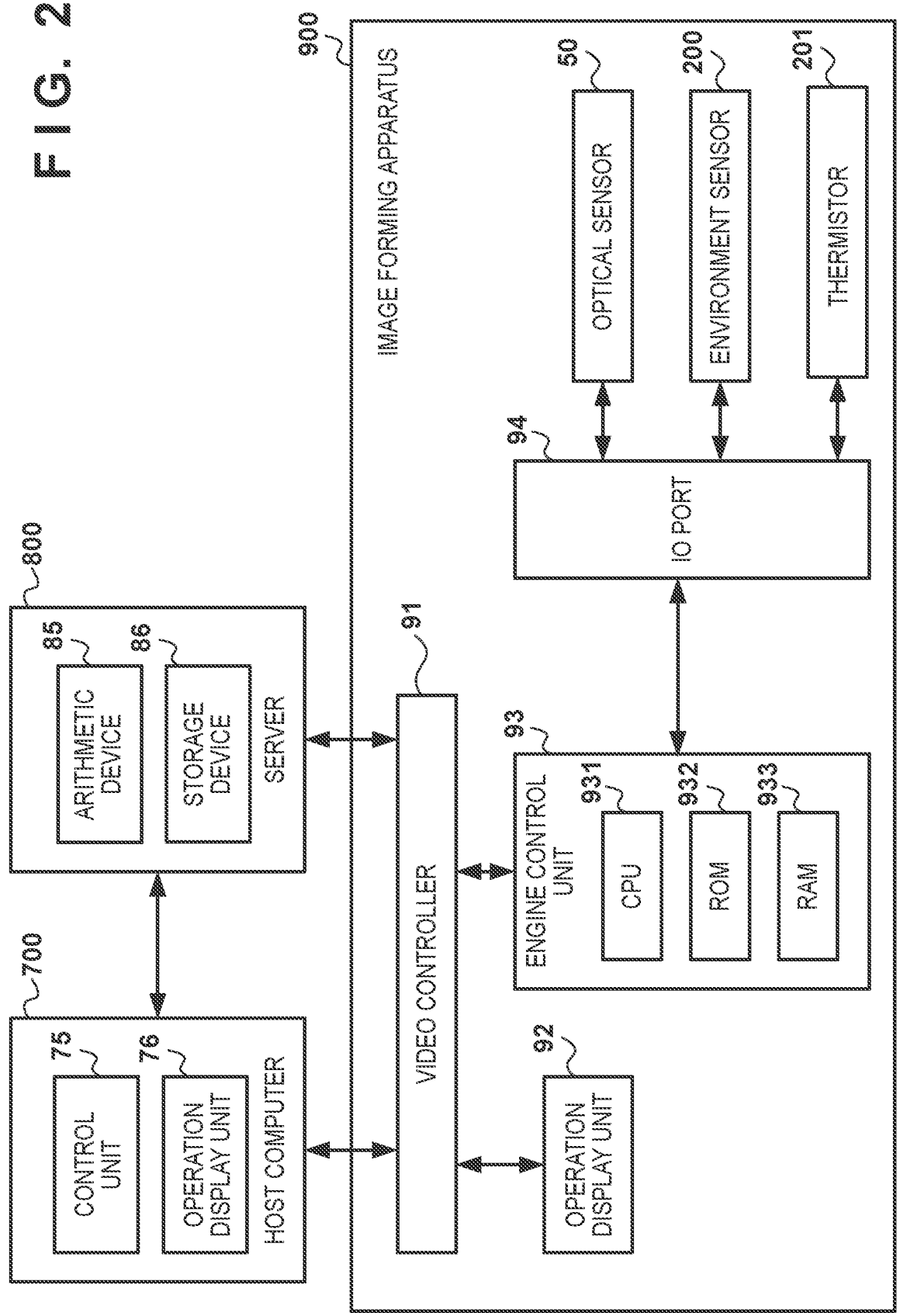
FIG. 2 is a configuration diagram of an image forming system according to an embodiment.

FIG. 2 illustrates an image forming system including an image forming apparatus 900, a server 800, and a host computer 700, according to the present embodiment. The host computer 700 includes a control unit 75 constituted by a CPU or the like, and an operation display unit 76 constituted by a display, a keyboard, a mouse, or the like. The host computer 700 transmits image data to the image forming apparatus 900 and causes the image forming apparatus 900 to form an image based on the image data.

The server 800 includes an arithmetic device 85 including a CPU, a GPU, or the like, and a storage device 86 including an HDD, an SSD, or the like. The arithmetic device 85 executes a program stored in the storage device 86. The server 800 is configured to communicate with one or more image forming apparatuses via a network. The server 800 can also be configured to communicate with one or more host computers 700 via a network.

An operation display unit 92 of the image forming apparatus 900 includes an operation panel and operation buttons or the like, and provides a user interface. A video controller 91 communicates with the host computer 700 and the server 800. For example, the video controller 91 outputs image data received from the host computer 700 to an engine control unit 93 to cause the engine control unit 93 to perform image forming control. The engine control unit 93 includes a CPU 931, a ROM 932, and a RAM 933, and forms an image on the recording material S by controlling each member described with reference to FIG. 1. The CPU 931 executes a program stored in the ROM 932 and uses the RAM 933 as a work area. The engine control unit 93 controls each member illustrated in FIG. 1 via an IO port 94 and acquires a detection result of the optical sensor 50 in the correction control. FIG. 2 illustrates an environment sensor 200 and a thermistor 201, which are not illustrated in FIG. 1. The environment sensor 200 detects environment information, that is, temperature, humidity, or the like in the image forming apparatus. The thermistor 201 detects the temperature of the laser unit 8.

Figure 3:
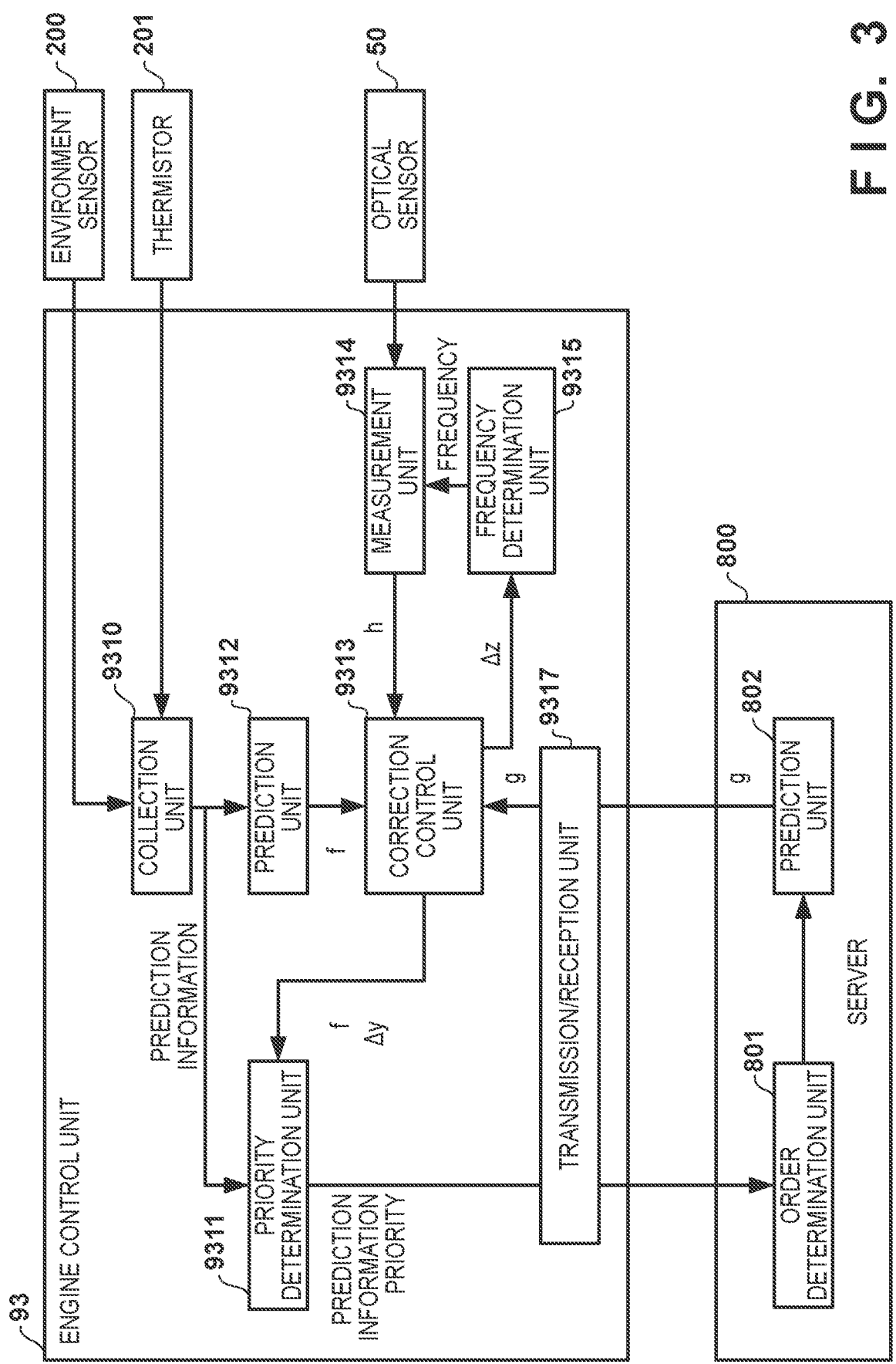
FIG. 3 is a functional block diagram of an image forming system according to an embodiment.

FIG. 3 is a functional block diagram illustrating functions implemented by the CPU 931 of the engine control unit 93 and functions implemented by the arithmetic device 85 of the server 80. As described above, the CPU 931 implements the function illustrated in FIG. 3 by executing the program stored in the ROM 932. The arithmetic device 85 implements the functions illustrated in FIG. 3 by executing a program stored in the storage device 86. In the following, the present embodiment will be described by taking, as an example, prediction processing of a developing bias value (control target value), which is one of image forming conditions pertaining to density, by setting the density of an image as a control object. However, the control target value predicted in the prediction processing is not limited to the developing bias value, and the present invention can be applied to prediction of an arbitrary control target value. In the following example, an appropriate developing bias value (control target value) is predicted and determined based on the temperature and humidity detected by the environment sensor 200 and the temperature detected by the thermistor 201 or the like. However, the content of the information (hereinafter, prediction information) used for determining the control target value is arbitrary. For example, the total rotation amount of the developing roller of the developing unit 5 and the total rotation amount of the photoconductor 1 can be used as the prediction information for predicting the developing bias value. The prediction information is information that can be acquired without affecting the image forming process. That is, downtime of image forming for acquiring the prediction information does not occur. Although the developing bias values of the respective colors (yellow, magenta, cyan, and black) are independently controlled, the developing bias values of one color will be described below.

A collection unit 9310 repeatedly acquires the prediction information from the environment sensor 200 and the thermistor 201 and notifies a prediction unit 9312 and a priority determination unit 9311 of the prediction information.

The prediction unit 9312 predicts a developing bias value f based on the prediction information and notifies a correction control unit 9313 of the developing bias value f. The prediction unit 9312 predicts the developing bias value f for each period V1. As an example, the period V is 60 seconds. Although details will be described later, the priority determination unit 9311 transmits the prediction information to the server 80 via a transmission/reception unit 9317 for each period V2. The period V2 is longer than the period V1. As an example, the period V2 is 30 minutes. Upon receiving the prediction information from the image forming apparatus 900, the server 800 predicts a developing bias value g and transmits the developing bias value g to the image forming apparatus 900. The transmission/reception unit 9317 of the image forming apparatus 90) notifies the correction control unit 9313 of the developing bias value g received from the server 800. The server 800 predicts the developing bias values g of a plurality of image forming apparatuses. Therefore, the transmission period of the developing bias value g from the server 800 to the image forming apparatus 900 varies depending on the processing load of the prediction processing in the server 800. That is, the period for the image forming apparatus 900 to acquire the developing bias value g from the server 800 is V2 on average, but the period between acquisition timings may vary from period to period.

A measurement unit 9314 measures the density based on the detection result of the toner image for density correction by the optical sensor 50 in the density correction control, and determines a developing bias value h necessary for obtaining a target density. Then, the measurement unit 9314 notifies the correction control unit 9313 of the determined developing bias value h. Here, the density to be controlled is directly controlled by the developing bias value which is a control target value. That is, the developing bias value is one of the image forming conditions for directly controlling the density to be controlled. The determination of the developing bias value as the control target value based on the density can also be referred to as prediction of the developing bias value based on the measured density. However, the correlation between the developing bias value and the density is stronger than the correlation between the temperature or the like, which is the prediction information, and the developing bias value. In other words, the measurement unit 9314 determines (predicts) the control target value based on information having a stronger correlation with the control target value than the prediction unit 9312 and a prediction unit 802. Therefore, the reliability of the developing bias value h is higher than those of the developing bias value f and the developing bias value g. However, the density correction control for measuring the density is accompanied by downtime of image forming. On the other hand, the acquisition of the prediction information used by the prediction unit 9312 and the prediction unit 802 has an advantage of not accompanied by downtime of image forming.

As described above, the developing bias value f is updated for the period V1, the developing bias value g is updated for the period V2 on average, and the developing bias value h is updated when the density correction control is executed. As described above, since the developing bias value h is a value based on the actual measured value of the density by the density correction control, the reliability is the highest. Further, since the server 800 has a higher processing performance than the image forming apparatus 900, the reliability of the developing bias value g is higher than the reliability of the developing bias value f.

The correction control unit 9313 manages a prediction error $\Delta y$ and a prediction error $\Delta z$. Then, when the prediction unit 9312 predicts the developing bias value f at a time t, it calculates and updates the developing bias value r by the following equation (1).

$$f(t1)=f(t1)+\Delta y(t1) \qquad (1)$$

where f (t) is the developing bias value f predicted by the prediction unit 9312 at the time t1. $\Delta y$ (t1) is the prediction error $\Delta y$ at the time t1. The developing bias value f is a developing bias value actually used in image forming. After updating the developing bias value f, the correction control unit 9313 sets the updated developing bias value f as the developing bias value and performs image forming until the next updating of the developing bias value f.

Further, when acquiring the developing bias value g at a time t2, the correction control unit 9313 calculates and updates the prediction error $\Delta y$ based on the following equations (2) and (3). Further, the correction control unit 9313 updates the developing bias value f by the following equation (4).

$$g'(t2)=g(2)+\Delta z(t2) \qquad (2)$$

$$\Delta y(t2)=g'(t2)-f(tx) \qquad (3)$$

$$f(t2)=f(t2)+\Delta y(t2) \qquad (4)$$

Here, g (t2) is the developing bias value g acquired at the time t2, and $\Delta z$ (t2) is the prediction error $\Delta z$ at the time t2. A time tx is the time at which the prediction information used to predict the developing bias value g (t2) acquired at the time t2 is transmitted to the server 800. Further, f (tx) is the developing bias value f at the time tx.

Further, when acquiring the developing bias value h at a time t3, the correction control unit 9313 calculates and updates the prediction error $\Delta z$ based on the following equation (5). Further, the correction control unit 9313 calculates and updates the prediction error $\Delta y$ based on the following equations (6) and (7). Further, the correction control unit 9313 updates the developing bias value f by the following equation (8).

$$\Delta z\ (t3) = h\ (t3) - g\ (t3) \qquad (5)$$

$$\begin{aligned} g'\ (t3) &= g\ (t3) + \Delta z\ (t3) \\ &= g\ (t3) + h\ (t3) - g\ (t3) \\ &= h\ (t3) \end{aligned} \qquad (6)$$

$$\begin{aligned} \Delta y\ (t3) &= g'\ (t3) - f\ (t3) \\ &= h\ (t3) - f\ (t3) \end{aligned} \qquad (7)$$

$$\begin{aligned} f'\ (t3) &= f\ (t3) + \Delta y\ (t3) \\ &= f\ (t3) + h\ (t3) - f\ (t3) \\ &= h\ (t3) \end{aligned} \qquad (8)$$

Here, h (t3) is the developing bias value h acquired at the time t3, and g (t3) is the developing bias value g at the time t3. Further, f (t3) is the developing bias value f at the time t3.

The correction control unit 9313 sets the prediction error $\Delta z$ to 0 until the first developing bias value h and the first developing bias value g are acquired. Similarly, the correction control unit 9313 sets the prediction error $\Delta y$ to 0 until the first developing bias value g is obtained. That is, the initial values of the prediction error $\Delta z$ and the prediction error $\Delta y$ are 0.

From equation (5), the prediction error $\Delta z$ is a difference between the developing bias value h based on the actual measurement value and the developing bias value g predicted by the server 800. Since the reliability of the developing bias value h based on the actual measurement value is the highest, the prediction error $\Delta z$ corresponds to the prediction error of the prediction processing in the server 800. Therefore, the developing bias value g' acquired by the equations (2) and (6) is acquired by reducing the prediction error included in the developing bias value g. Therefore, the prediction error $\Delta y$ acquired by equation (3) and equation (7) corresponds to the prediction error of the prediction processing in the prediction unit 9312. Therefore, the developing bias value f acquired by equation (1), equation (4), and equation (8) is acquired by reducing the prediction error included in the developing bias value f.

In equation (3), the prediction error Δy is calculated using the developing bias value f at the time tx (at the time of transmission of the prediction information) instead of the developing bias value f (t2) at the reception time t2 of the developing bias value g. This takes into consideration the time difference between the transmission of the prediction information and the reception of the developing bias value g as a response thereto. As described above, since the server 800 performs the prediction processing for many image forming apparatuses, the prediction unit 9312 may update the developing bias value f during a period from the transmission of the prediction information to the reception of the developing bias value g. When the prediction unit 9312 uses f (t2) to calculate the prediction error Δy when the developing bias value f has been updated, the prediction error Δy is calculated using the developing bias values f and g which are predicted by different prediction information. This leads to deterioration in the accuracy of the prediction error Δy of the prediction unit 9312. Therefore, in the present embodiment, not f (t2) but f (tx) is used to determine the prediction error Δy when the developing bias value g is received. However, for example, in a case where the time from the transmission of the prediction information to the server 800 to the reception of the developing bias value g is not long, the accuracy is not deteriorated even when f (t2) is used for the determination of the prediction error Δy. Therefore, f (t2) may be used to determine the prediction error Δy when the developing bias value g is received.

In summary, in the present embodiment, the developing bias value f is updated when the developing bias value f is predicted and when the developing bias value g and the developing bias value h are acquired. The prediction error Δy is updated when the developing bias value g and the developing bias value h are acquired. Further, the prediction error Δz is updated when the developing bias value h is acquired. When the developing bias value g is acquired, only the prediction error Δy may be updated, and the developing bias value f may be updated when the developing bias value f is subsequently predicted. Similarly, when the developing bias value h is acquired, only the prediction error Δz and the prediction error Δy may be updated, and the developing bias value f may be updated when the developing bias value f is subsequently predicted. Further, when the developing bias value h is acquired, only the prediction error Δz may be updated, and the prediction error Δy may be updated when the developing bias value g is subsequently acquired.

The image forming apparatus of the present embodiment has a function of determining the developing bias value h based on the detection result of the density of the toner image for density correction. That is, the image forming apparatus has a function of determining a developing bias value to be used by performing measurement processing of measuring a density (physical quantity) to be controlled by the developing bias value (control target value). However, when it is difficult to measure the physical quantity of the control object by the control target value or when it is desired to omit the measurement function, the measurement function may not be provided. In this case, the correction control unit 9313 manages only the prediction error Δy. Then, the prediction error Δy is acquired by the following equation (9) without using the above equations (2) (3), and (5) to (8).

$$\Delta y = g(t2) - f(tx) \quad (9)$$

In this case, the prediction error Δy is updated every time the developing bias value g is acquired. The developing bias value f is updated each time the developing bias value g and the developing bias value f are acquired. The developing bias value f may be updated only when the developing bias value f is acquired. In addition, f (tx) in equation (9) may be f (t2).

Next, the prediction processing of the developing bias value g by the server 800 will be described. As described above, the priority determination unit 9311 transmits the prediction information to the server 800 for each period V2. At this time, the priority determination unit 9311 determines the priority of the prediction information to be transmitted, and also notifies the server 800 of priority information indicating the determined priority. In the present embodiment, the priority is set to two levels of "high" and "low". However, the priority may be set to three or more levels. For example, the priority determination unit 9311 can set the priority to "high" when the prediction information has greatly changed, when the prediction error Δy is greater than a predetermined value, or when the change amount from the developing bias value f up to that time due to updating of the developing bias value f is greater than a predetermined value. The prediction error Δy and the developing bias value f are notified from the correction control unit 9313. In addition, the priority determination unit 9311 can set the priority to "high" when the urgency of acquisition of the developing bias value g is high based on other states of the image forming apparatus. When the priority is set to three or more levels, the priority is set to be higher as the prediction error Δy or the change amount of the developing bias value f is larger or the urgency is higher.

An order determination unit 801 acquires prediction information and priority information indicating the priority of the prediction information from a plurality of image forming apparatuses 900. Based on the priority and the acquisition timing of the prediction information, the order determination unit 801 sequentially determines the prediction information to be used for prediction of the developing bias value g, and outputs the determined prediction information to the prediction unit 802. The prediction unit 802 predicts the developing bias value g based on the prediction information, and transmits the predicted developing bias value g to the image forming apparatus 900 that has transmitted the prediction information used to predict the developing bias value g.

Figure 4:
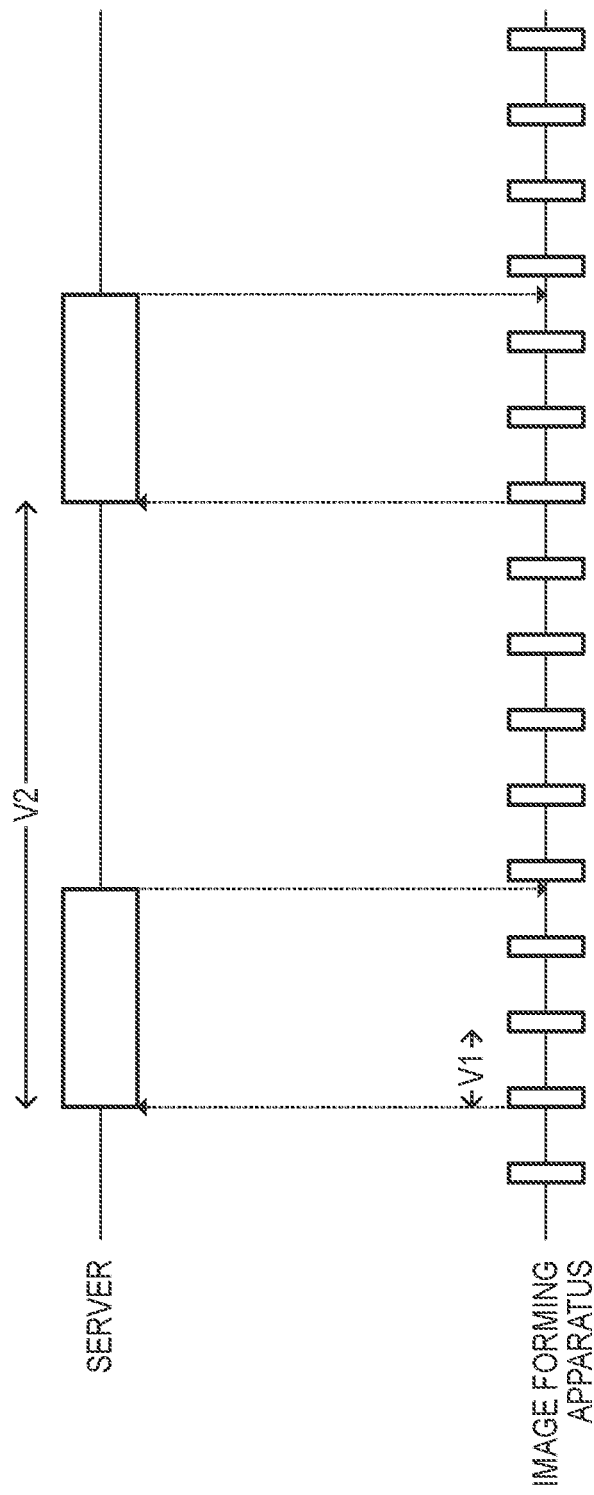
FIG. 4 is a diagram illustrating a relationship between prediction processing performed by an image forming apparatus and by a server according to an embodiment.

FIG. 4 is an explanatory diagram of prediction timing in the prediction unit 9312 of the image forming apparatus 900 and prediction timing in the prediction unit 802 of the server 800. The prediction unit 9312 predicts the developing bias value f for each period V1 as described above. As an example, V1 is 60 seconds. In addition, the priority determination unit 9311 transmits the prediction information to the server for each period V2. Here, the period V2 is set to be longer than the period V1. As an example, the period V2 is 30 minutes. As described above, the prediction unit 802 of the server sequentially predicts the developing bias values g of the plurality of image forming apparatuses based on the priority. Therefore, even when the image forming apparatus 900 transmits the prediction information for the period V2, the period of acquiring the developing bias value g as a response is not constant. However, the average period for acquiring the developing bias value g is V2.

In the server 800, since many calculation resources such as the arithmetic device 85 and the storage device 86 can be used, highly accurate prediction calculation can be performed, and a prediction error of a prediction value (developing bias value g) with respect to an ideal control target value is smaller than a prediction error in the prediction unit 9312. However, since the server 800 performs prediction calculations for the plurality of image forming apparatuses, it is not possible to perform prediction calculations for all of the image forming apparatuses at very short time intervals of, for example, 60 seconds. Therefore, in the present embodiment, the control target value (developing bias value f) is predicted at short time intervals in the image forming apparatus. With this configuration, it is possible to reduce the frequency of the prediction calculation in the server 800 for a certain one image forming apparatus. The image forming apparatus 900 acquires the prediction error Δy when acquiring an accurate control target value from the server 800. Then, the image forming apparatus 900 corrects the control target value acquired by the image forming apparatus 900 with the prediction error Δy until the control target value is acquired from the server 800 next time. Therefore, it is possible to accurately control the control object based on the control target value acquired by the image forming apparatus 900. Further, when the actual measurement value can be acquired, the prediction error Δz included in the control target value acquired from the server 80 can be determined. By further correcting the control target value acquired by the image forming apparatus 900 with the prediction error Δz, the control object can be controlled with higher accuracy.

Figure 5:
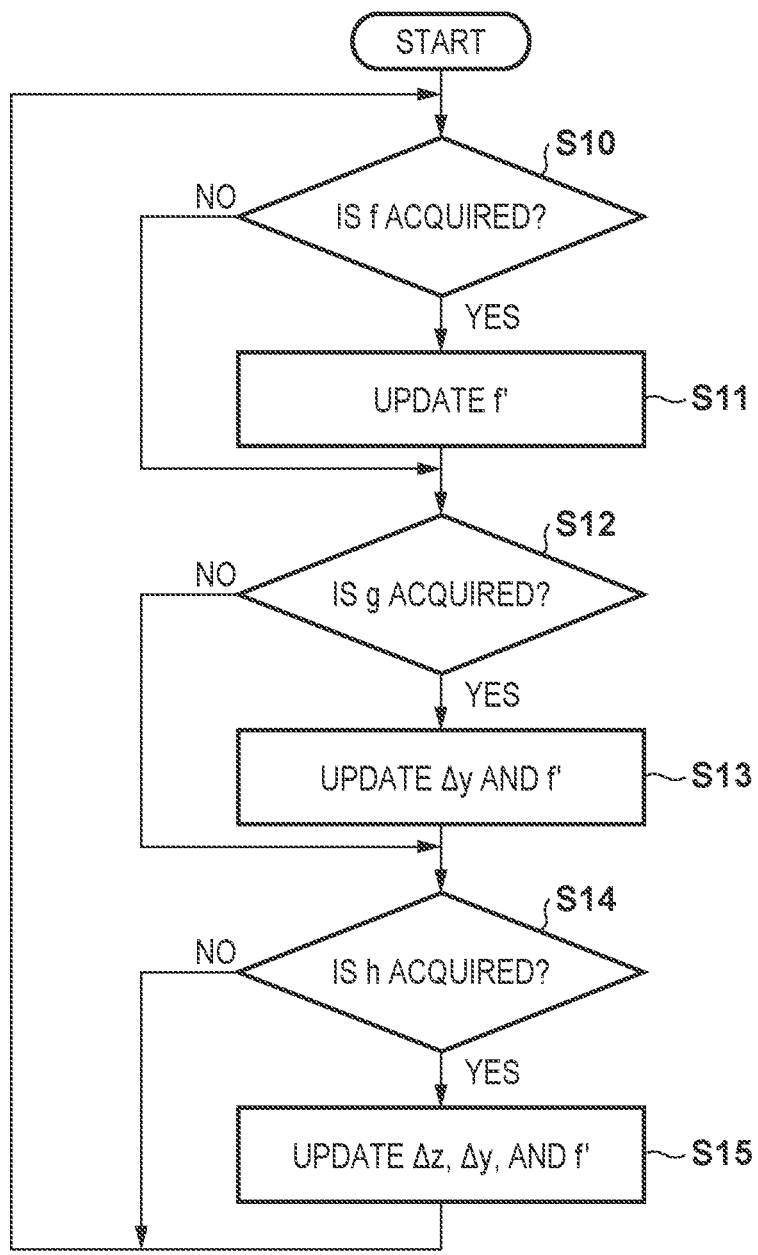
FIG. 5 is a flowchart of processing performed by a correction control unit according to an embodiment.

FIG. 5 is a flowchart of processing executed by the correction control unit 9313. In step S10, the correction control unit 9313 determines whether the developing bias value f has been acquired. When the developing bias value f has not been acquired, the correction control unit 9313 proceeds the processing to S12. When the developing bias value f has been acquired, the correction control unit 9313 obtains and sets the developing bias value F based on equation (1) in S11, and proceeds the processing to S12. In S12, the correction control unit 9313 determines whether the developing bias value g has been acquired. When the developing bias value g has not been acquired, the correction control unit 9313 proceeds the processing to S14. In S13, when the developing bias value g has been acquired, the correction control unit 9313 obtains the prediction error Δy based on equation (2) and equation (3). Further, in S13, the correction control unit 9313 obtains and sets the developing bias value f based on equation (4), and proceeds the processing to S14. In S14, the correction control unit 9313 determines whether the developing bias value h has been acquired. When the developing bias value b has not been acquired, the correction control unit 9313 repeats the processing from S10. In S15, when the developing bias value h has been acquired, the correction control unit 9313 obtains the prediction error Δz based on equation (5) and further obtains the prediction error Δy based on equations (6) and (7). Further, in S15, the correction control unit 9313 obtains and sets the developing bias value f based on equation (8), and repeats the processing from S10. As described above, the developing bias value F may not be updated in S13 and S15. In S15, only the prediction error Δz may be updated.

Next, the processing in a frequency determination unit 9315 illustrated in FIG. 3 will be described. After updating the prediction error Δz, the correction control unit 9313 notifies the frequency determination unit 9315 of the updated prediction error Δz. The frequency determination unit 9315 updates the execution frequency of the density correction control (measurement processing) based on the notified prediction error Δz. For example, the frequency determination unit 9315 increases the execution frequency of the density correction control when the updated Δz continuously exceeds a first threshold for a predetermined number of times. That is, the execution interval of the density correction control is shortened. The predetermined number of times may be one. How to shorten the execution interval is arbitrary, and for example, the execution interval can be halved. A minimum value of the execution interval may be determined in advance and the execution interval may not be shorter than the minimum value. In addition, the frequency determination unit 9315 decreases the execution frequency of the density correction control when the updated Δz does not exceed the first threshold continuously for a predetermined number of times. That is, the execution interval of the density correction control is lengthened. The predetermined number of times may be one. How to lengthen the execution interval is also arbitrary, and for example, the execution interval can be doubled. A maximum value of the execution interval may be determined in advance and the execution interval may not be longer than the maximum value. The frequency determination unit 9315 notifies the measurement unit 9314 of the determined frequency. The measurement unit 9314 executes density correction control in accordance with the notified frequency. When the developing bias value g is not acquired from the server 800 within a predetermined period, for example, within 5 minutes after the prediction information is transmitted to the server 800, the frequency determination unit 9315 can shorten the execution interval of the density correction control.

Figure 6:
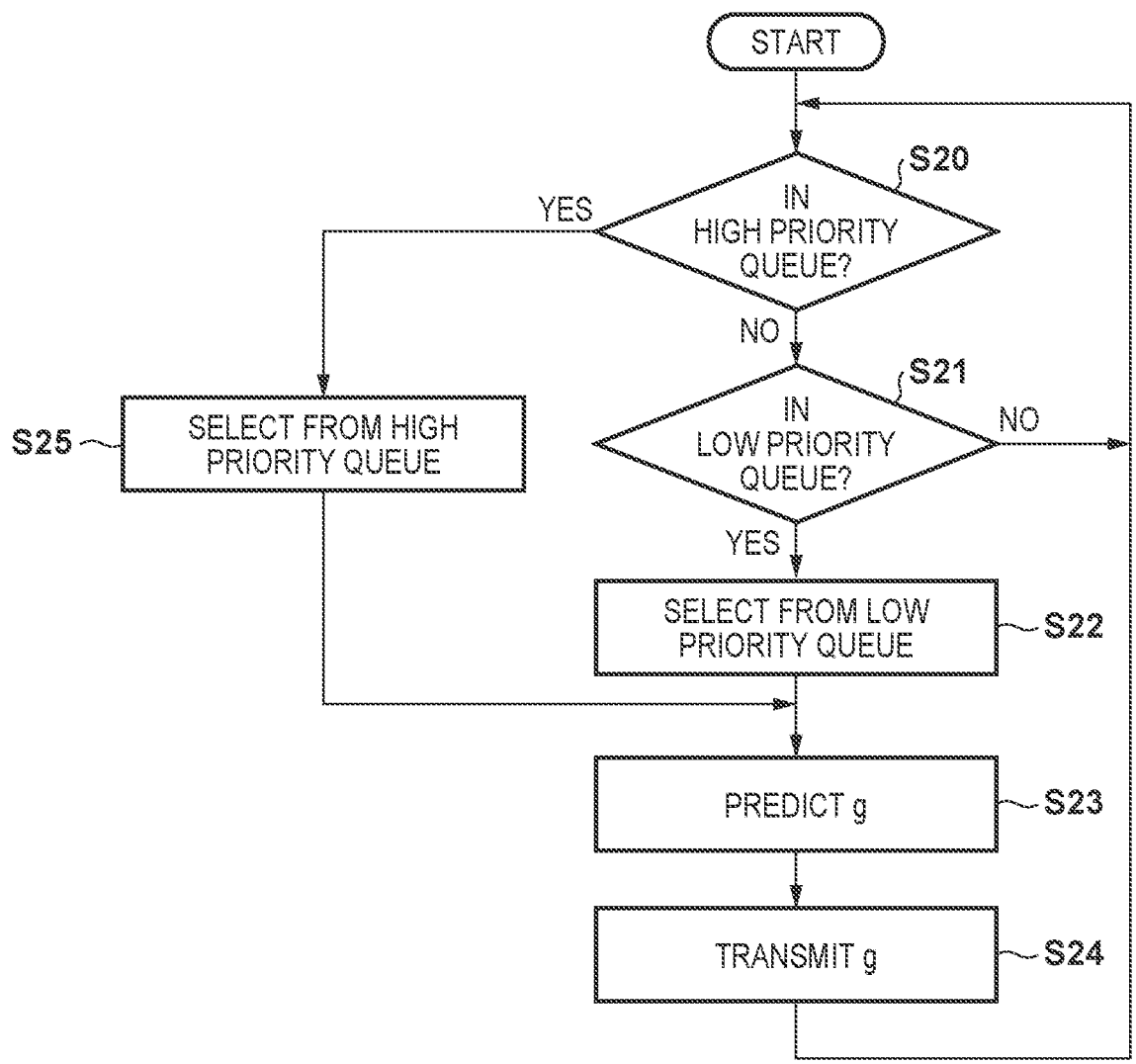
FIG. 6 is a flowchart of processing performed by a server according to an embodiment.

FIG. 6 is a flowchart of processing executed by the server 800. Upon receiving the prediction information and the priority information from the image forming apparatus 900, the server 800 adds the prediction information to the end of the queue provided for each prediction priority. In S20, the server 8) determines whether the prediction information is stored in the queue having the high prediction priority. When the prediction information is stored in the queue having the high prediction priority, the server 800 selects in S25 the prediction information at the head of the queue having the high prediction priority, and proceeds the processing to S23. The "head" prediction information is the prediction information stored in the queue at the earliest timing. On the other hand, in S20, when the prediction information is not stored in the queue having the high prediction priority, the server 800 determines in S21 whether the prediction information is stored in the queue having the low prediction priority. When the prediction information is stored in the queue having the low prediction priority, the server 800 selects in S22 the prediction information at the head of the queue having the low prediction priority, and proceeds the processing to S23. On the other hand, in S21, when the prediction information is not stored in the queue having the low prediction priority, the server 800 repeats the process from S20.

In S23, the server 800 predicts the developing bias value g based on the prediction information selected in S22 or S25. Then, in S24, the server 800 transmits the developing bias value g predicted in S23 to the image forming apparatus 900 that is the transmission source of the prediction information used to predict the developing bias value g, and repeats the process from S20.

FIG. 7A illustrates temporal change of the developing bias value f and the developing bias value f. Since the developing bias value g is not acquired until a time Ta, the prediction error Δy is the initial value of 0, and thus the developing bias value f and the developing bias value f are the same. The one dot chain line in FIG. 7A illustrates the temporal change of the ideal developing bias value for achieving the target density. By correcting the developing bias value f based on the prediction error Δy, the error between the developing bias value f actually used by the image forming apparatus and the ideal developing bias value is reduced. In FIG. 7B, a reference numeral of 60 denotes a temporal change of the prediction error of the developing bias value f with respect to the ideal developing bias value, and a reference numeral of 61 denotes a temporal change of the prediction error of the developing bias value f.

As described above, in the present embodiment, the image forming apparatus repeatedly predicts a first target value (developing bias value f) for the period V1 based on the collected prediction information. In addition, the image forming apparatus repeatedly transmits the prediction information to the server for the period V2, and acquires a second target value (developing bias value g) which the server has predicted based on the transmitted prediction information. The time interval of the period V1 is shorter than the time interval of the period V2. Here, since the server can use more calculation resources for the prediction processing than the image forming apparatus, the accuracy of the second target value is higher than that of the first target value. However, in the server, since the second target value used by a specific image forming apparatus is predicted for a period longer than the update frequency of the first target value in the image forming apparatus, it is possible to suppress an increase in the processing load of the prediction processing in the server. On the other hand, when the second target value is obtained, the image forming apparatus determines and manages the prediction error $\Delta y$ of the prediction processing in the image forming apparatus based on the first target value. When the first target value is predicted, the image forming apparatus corrects the predicted first target value with the prediction error $\Delta y$ at that time and sets the corrected first target value as a control target value to be actually used. Therefore, even when the prediction accuracy is low, the image forming apparatus can reduce the error by the second target value acquired from the server, and can accurately control the control object. In addition, it is possible to suppress an increase in the processing load of the prediction processing in the image forming apparatus.

Further, the image forming apparatus can be provided with a function of acquiring a third target value (developing bias value h) by performing measurement processing of measuring the physical quantity of the control object controlled by the control target value. In the present embodiment, the physical quantity to be measured is a density of an image. In this case, the image forming apparatus further manages the prediction error $\Delta z$ of the prediction processing in the server in addition to the prediction error $\Delta y$. When the third target value is acquired, the image forming apparatus updates the prediction error $\Delta z$ based on the third target value and the second target value when the third target value has been acquired. When the third target value is acquired, the image forming apparatus can update the prediction error $\Delta y$ based on the third target value and the first target value when the third target value has been acquired. In addition, in a case where the image forming apparatus has a function of acquiring the third target value, when the image forming apparatus acquires the second target value, the image forming apparatus can update the prediction error $\Delta y$ based on the first target value and the prediction error $\Delta z$ at that time, and the second target value. In this way, by updating the prediction error when the third target value and the second target value are acquired, the image forming apparatus can accurately control the control object even when the prediction accuracy by the image forming apparatus is low.

When updating the prediction error $\Delta y$ in addition to when predicting the first target value, the image forming apparatus can correct the first target value at that time with the prediction error $\Delta y$ and update the control target value to be actually used.

Further, the image forming apparatus can vary the execution frequency of the measurement processing for acquiring the third target value. The update of the execution frequency can be performed, for example, based on the prediction error $\Delta z$. A large prediction error $\Delta z$ means that the accuracy of prediction processing in the server is low. Therefore, the image forming apparatus can accurately perform control by increasing the execution frequency of the measurement processing as the prediction error $\Delta z$ increases. In addition, the image forming apparatus reduces the execution frequency of the measurement processing as the prediction error $\Delta z$ decreases. Thus, it is possible to prevent the downtime of image forming from being prolonged by frequently performing the measurement processing even though the prediction accuracy in the server is high. In addition, the image forming apparatus can increase the execution frequency when the second target value is not received within a predetermined period after the prediction information is transmitted to the server.

Second Embodiment

Figure 8:
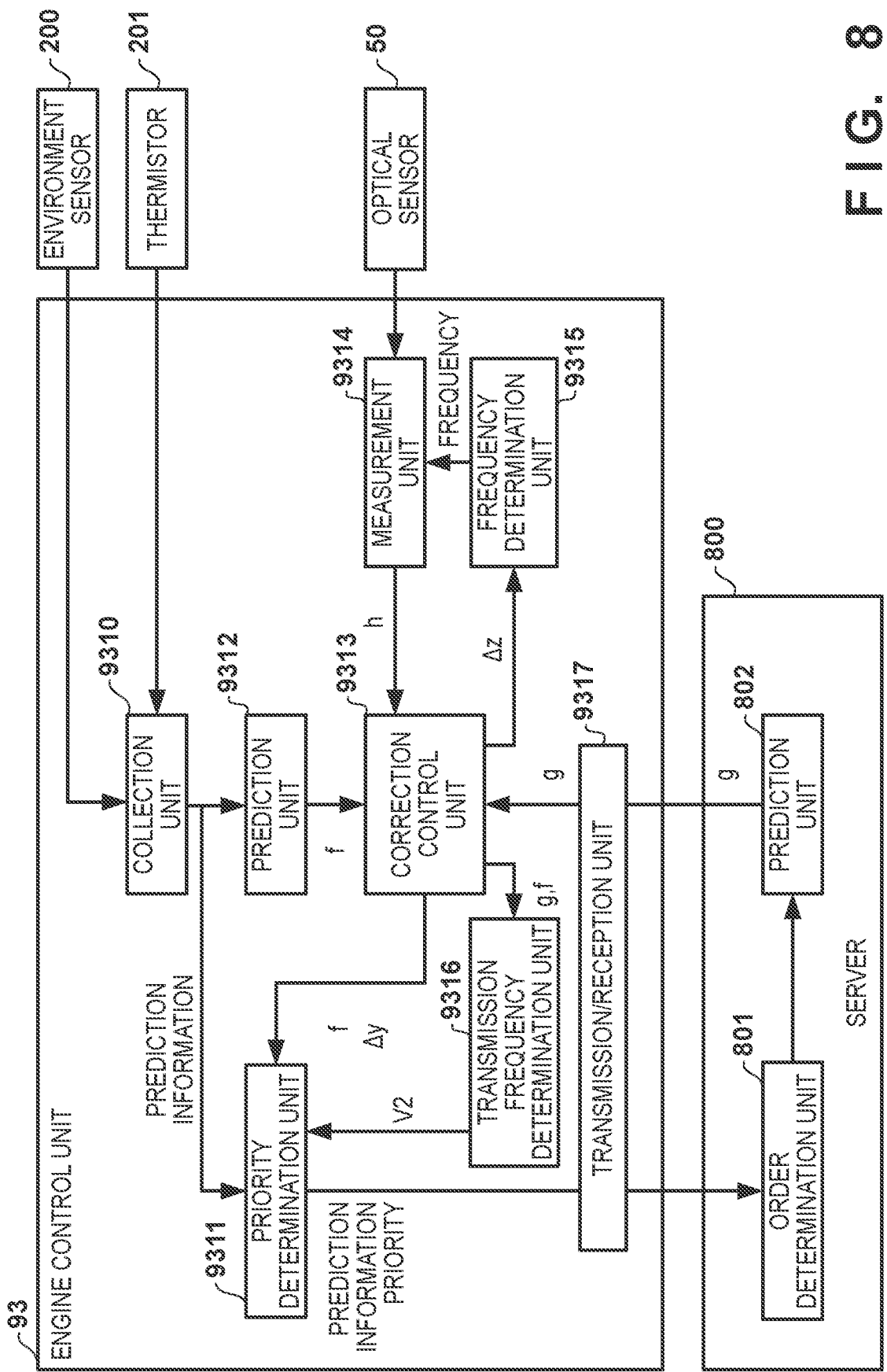
FIG. 8 is a functional block diagram of an image forming system according to an embodiment.

Next, the second embodiment will be described focusing on differences from the first embodiment. FIG. 8 is a functional block diagram illustrating functions implemented by the CPU 931 of the engine control unit 93 and functions implemented by the arithmetic device 85 of the server 800. The same components as those of the first embodiment (FIG. 3) are denoted by the same reference numerals, and differences from the first embodiment will be mainly described below. First, in the present embodiment, the control object is an image forming position for suppressing misregistration, and the control target value is a misregistration amount. That is, the prediction unit 9312 of the engine control unit 93 predicts the misregistration amount f, and the prediction unit 802 of the server 80 predicts the misregistration amount g. For the prediction of the misregistration amount f and the misregistration amount g, it is possible to use arbitrary information correlated with a misregistration amount that can be acquired without downtime of image forming. Note that the accuracy of the misregistration amount f is lower than the accuracy of the misregistration amount g due to a difference in calculation resources available for prediction. The measurement unit 9314 actually measures the misregistration amount h of the toner image based on the detection result of the toner image for misregistration correction by the optical sensor 50. Although the misregistration correction control is accompanied by the downtime of image forming, the misregistration amount h is the most reliable because the misregistration amount is directly measured. Then, the correction control unit 9313 obtains the misregistration amount f and controls the forming position of the toner image, that is, the formation timing of the toner image based on the misregistration amount 1.

The misregistration amount is a position shift amount of another toner image with respect to the toner image of the reference color. For example, when yellow is used as the reference color, the image forming apparatus 900 obtains three misregistration amounts of cyan, magenta, and black with respect to yellow. However, in the following description, any one of misregistration amounts will be described.

In the first embodiment, the engine control unit 93 transmits the prediction information to the server 800 every time the period V2 elapses. In the present embodiment, the period V2 is variable. Therefore, the engine control unit 93 is provided with a transmission frequency determination unit 9316. The transmission frequency determination unit 9316 obtains a prediction error Δe by the following equation (10) based on the input color shift amounts f and g.

$$\Delta e(t4) = g(t4) - f(t4) \tag{10}$$

A time t4 is the time at which the color shift amount f is acquired based on the prediction information.

Figure 9:
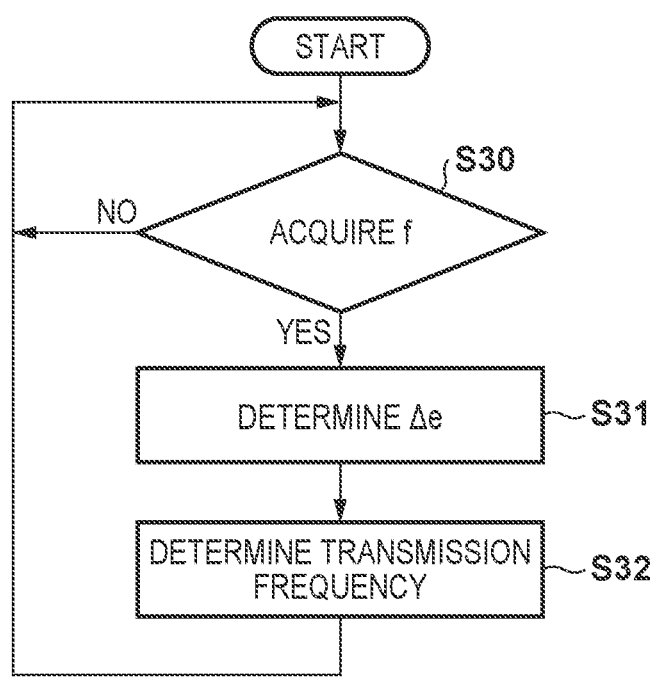
FIG. 9 is a flowchart of processing performed by a transmission frequency determination unit according to an embodiment.

FIG. 9 is a flowchart of processing executed by the transmission frequency determination unit 9316. In S30, the transmission frequency determination unit 9316 waits until a new misregistration amount f is acquired. Upon acquiring the misregistration amount f, the transmission frequency determination unit 9316 determines the prediction error Δe according to equation (10). As the misregistration amount g, a value finally acquired from the server ( ) is used. In S32, the transmission frequency determination unit 9316 determines the transmission frequency of the prediction information to the server 800 based on the prediction error Δe. For example, when the value of the prediction error Δe continuously exceeds a second threshold for a predetermined number of times, the transmission frequency is increased. That is, the period V2 is shortened. The predetermined number of times may be one. How to shorten the period V2 is arbitrary, and for example, the period V2 can be halved. The transmission frequency determination unit 9316 decreases the transmission frequency when the value of the prediction error Δe is continuously equal to or less than the second threshold for a predetermined number of times. That is, the period V2 is lengthened. The predetermined number of times may be one. How to lengthen the period V2 is also arbitrary, and for example, the period V2 can be doubled. A minimum and maximum values of the period V2 may be determined in advance, and the period V2 may be changed within a range from the minimum to the maximum.

In addition to or instead of controlling the period V2 based on the prediction error Δe, the period V2 may be controlled based on the change amount of the misregistration amount f. In this case, the transmission frequency determination unit 9316 obtains the absolute value of the change amount with respect to the previously obtained misregistration amount f every time the misregistration amount f is obtained. When the absolute value of the change amount continuously exceeds a third threshold for a predetermined number of times, the transmission frequency can be increased, and when the absolute value of the change amount is continuously equal to or less than the third threshold for a predetermined number of times, the transmission frequency can be decreased. The predetermined number of times may be one.

As described above, according to the present embodiment, when the image forming apparatus predicts the misregistration amount f (first target value), the image forming apparatus acquires the prediction error Δe based on the misregistration amount g (second target value) at that time. Since a large prediction error Δe means that the prediction accuracy of the first target value is low, the transmission frequency of the prediction information is increased as the prediction error Δe is larger. That is, as the prediction error Δe is larger, the period V2 (time interval) for transmitting the prediction information is shortened. The first target value (color misregistration f) is predicted at a high frequency, and its large change amount means that the prediction accuracy of the first target value is low. This is because the control target value usually does not change greatly for a short period of time. Therefore, also in such a case, the transmission frequency of the prediction information is increased. With this configuration, the control object can be accurately controlled.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-003947, filed on Jan. 14, 2020, which is hereby incorporated by reference herein in its entirety.

What is claimed is:

1. A control apparatus for predicting a control target value and controlling a control object according to the control target value, the control apparatus comprising:
   one or more hardware processors; and
   one or more memories configured to store instructions that, when executed by the one or more hardware processors, cause the one or more hardware processors to function as:
   a collection unit configured to collect prediction information for predicting the control target value;
   a prediction unit configured to repeatedly predict a first target value based on the prediction information collected by the collection unit;
   a transmission/reception unit configured to repeatedly transmit the prediction information to a server and receive from the server, as a response to the prediction information transmitted to the server, a second target value predicted by the server based on the prediction information;
   a management unit configured to update a first error of prediction in the prediction unit based on the second target value and the first target value; and a setting unit configured to set the control target value based on the first target value and the first error, wherein a first time interval in which the prediction unit repeatedly predicts the first target value is shorter than a second time interval in which the transmission/reception unit repeatedly transmits the prediction information to the server, wherein the transmission/reception unit is further configured to determine a priority of prediction processing of the second target value in the server by the prediction information when transmitting the prediction information to the server, and transmit priority information indicating the determined priority to the server, and wherein the transmission/reception unit is further configured to increase the priority as the first error increases or as a change amount of the first target value predicted by the prediction unit increases.

2. The control apparatus according to claim 1, wherein when the prediction unit predicts the first target value, the setting unit is further configured to set the control target value based on the first target value and the first error when the prediction unit predicts the first target value.

3. The control apparatus according to claim 1, wherein when the second target value is received from the server, the management unit is further configured to update the first error to a difference between the second target value and the first target value when the prediction information used to predict the second target value is transmitted to the server, or a difference between the second target value and the first target value when the second target value is received.

4. The control apparatus according to claim 1, further comprising a sensor, wherein the one or more hardware processors further execute the instructions to function as an acquisition unit configured to acquire a third target value by performing measurement processing of a control object controlled by the control target value with the sensor, and wherein the setting unit is further configured to set the third target value as the control target value when the acquisition unit acquires the third target value.

5. The control apparatus according to claim 1, further comprising a sensor, wherein the one or more hardware processors further execute the instructions to function as an acquisition unit configured to acquire a third target value by performing measurement processing of a control object controlled by the control target value with the sensor, and wherein the management unit is further configured to:
manage a second error of prediction in the server;
when the acquisition unit acquires the third target value, update the second error based on the third target value and the second target value when the third target value is acquired; and
update the first error based on the third target value and the first target value when the third target value is acquired.

6. The control apparatus according to claim 5, wherein the management unit is further configured to:
when the acquisition unit acquires the third target value, update the second error to a difference between the third target value and the second target value when the third target value is acquired; and
update the first error to a difference between the third target value and the first target value when the third target value is acquired.

7. The control apparatus according to claim 5, wherein the management unit is further configured to:
when the second target value is received from the server, obtain a sum of the second target value and the second error when the second target value is received; and
update the first error to a difference between the sum and the first target value when the prediction information used for prediction of the second target value is transmitted to the server, or a difference between the sum and the first target value when the second target value is received.

8. The control apparatus according to claim 5, wherein the one or more hardware processors further execute the instructions to function as a determination unit configured to determine an execution frequency of the measurement processing based on the second error.

9. The control apparatus according to claim 8, wherein the determination unit is further configured to:
increase the execution frequency when the second error after the update by the management unit is larger than a first threshold or when the second error after the update by the management unit is larger than the first threshold for a predetermined number of consecutive times; and
decrease the execution frequency when the second error after the update by the management unit is smaller than the first threshold or when the second error after the update by the management unit is smaller than the first threshold for a predetermined number of consecutive times.

10. The control apparatus according to claim 8, wherein the determination unit is further configured to increase the execution frequency when the second target value is not received from the server within a predetermined period after the prediction information is transmitted to the server.

11. The control apparatus according to claim 1, wherein the setting unit is further configured to, when the management unit updates the first error, set the control target value based on the first target value when the first error is updated and the updated first error.

12. The control apparatus according to claim 1, wherein the transmission/reception unit is further configured to determine the second time interval based on the first target value.

13. The control apparatus according to claim 12, wherein the transmission/reception unit is further configured to:
determine a change amount of the first target value predicted by the prediction unit;
shorten the second time interval when the determined change amount is larger than a second threshold or when the determined change amount is larger than the second threshold for a predetermined number of consecutive times; and
lengthen the second time interval when the determined change amount is smaller than the second threshold or when the determined change amount is smaller than the second threshold for a predetermined number of consecutive times.

14. The control apparatus according to claim 12, wherein the transmission/reception unit is further configured to:
when the prediction unit predicts the first target value, determine a difference between the first target value and the second target value when the first target value is predicted;

shorten the second time interval when the determined difference is larger than a third threshold or when the determined difference is larger than the third threshold for a predetermined number of consecutive times; and lengthen the second time interval when the determined difference is smaller than the third threshold or when the determined difference is smaller than the third threshold for a predetermined number of consecutive times.

15. The control apparatus according to claim 1, wherein the control apparatus is an image forming apparatus.

16. The control apparatus according to claim 15, wherein a density of an image or an image forming position is controlled by the control target value.

17. The control apparatus according to claim 1, wherein the second target value has higher prediction accuracy than the first target value.

18. A control system, comprising:
a control apparatus configured to predict a control target value and control a control object according to the control target value; and
a server;
the control apparatus comprising:
  one or more first hardware processors; and
  one or more first memories configured to store instructions that, when executed by the one or more first hardware processors, cause the one or more first hardware processors to function as:
    a collection unit configured to collect prediction information for predicting the control target value;
    a first prediction unit configured to repeatedly predict a first target value based on the prediction information collected by the collection unit;
    a transmission/reception unit configured to repeatedly transmit the prediction information to the server together with priority information indicating a priority of the prediction information, and to receive from the server, as a response to the prediction information transmitted to the server, a second target value predicted by the server based on the prediction information;
    a management unit configured to update a first error of prediction in the first prediction unit based on the second target value and the first target value; and
    a setting unit configured to set the control target value based on the first target value and the first error;
the server comprising:
  one or more second hardware processors; and
  one or more second memories configured to store instructions that, when executed by the one or more second hardware processors, cause the one or more second hardware processors to function as a second prediction unit configured to:
    when acquiring the prediction information and the priority information from the control apparatus, determine an order of prediction processing of the second target value in accordance with the prediction information based on the priority information;
    predict the second target value according to the determined order; and
    transmit the second target value to the control apparatus that is a transmission source of the prediction information used to predict the second target value,
wherein a first time interval in which the first prediction unit repeatedly predicts the first target value is shorter than a second time interval in which the transmission/reception unit repeatedly transmits the prediction information to the server, and
wherein the transmission/reception unit is further configured to increase the priority of the prediction information as the first error increases or as a change amount of the first target value predicted by the first prediction unit increases.

19. The control system according to claim 18, wherein the second target value has higher prediction accuracy than the first target value.

* * * * *